United States Patent Office 2,916,359
Patented Dec. 8, 1959

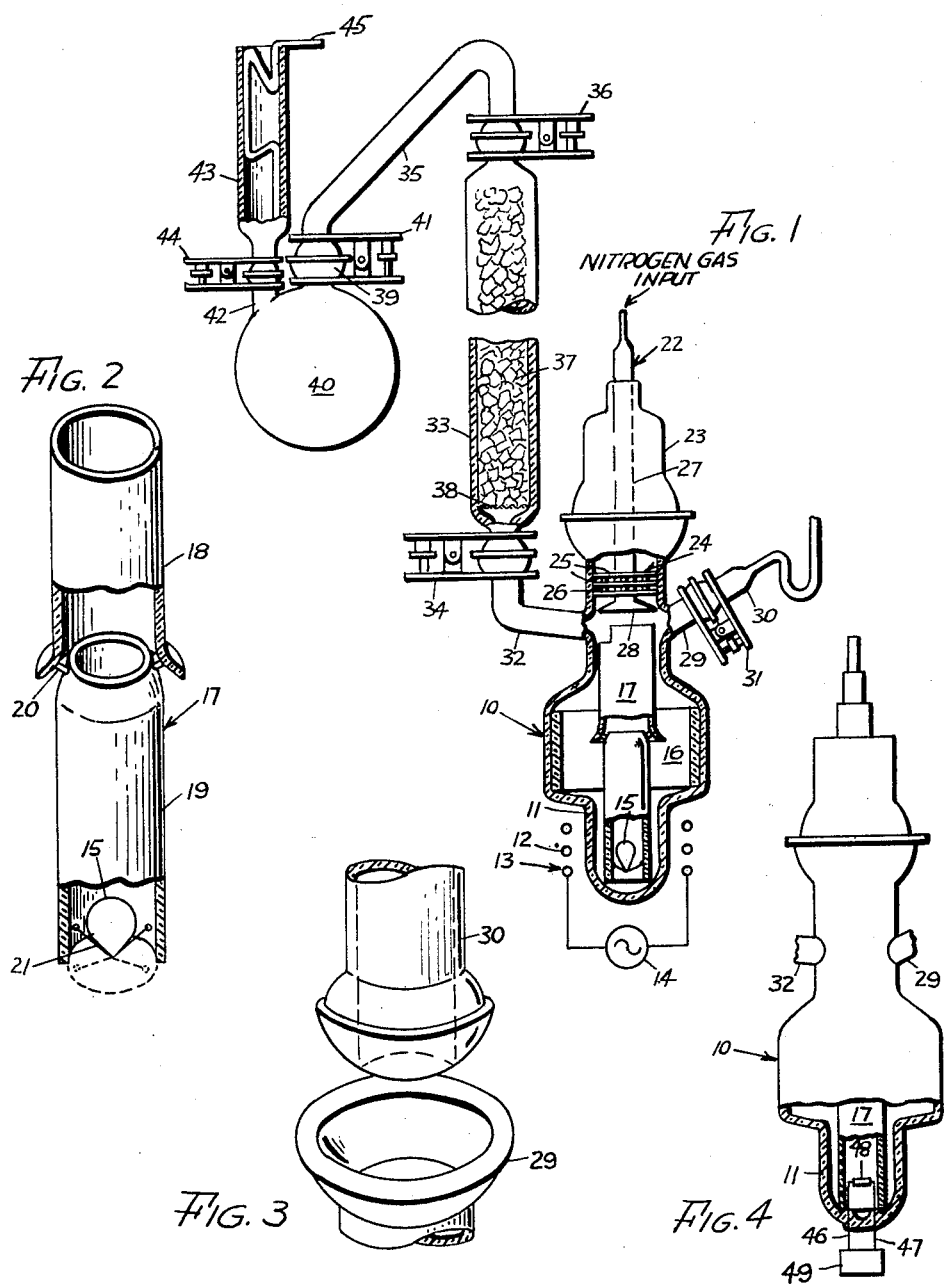

2,916,359

PREPARATION OF SUBSTANTIALLY PURE SILICON

Ray C. Ellis, Jr., Watertown, and Walter F. Leverton, Weston, Mass., assignors to Raytheon Company, a corporation of Delaware Application December 14, 1956, Serial No. 628,345

2 Claims. (Cl. 23—273)

This invention relates to the preparation of substantially pure elemental silicon, and in particular, to the method and apparatus for preparing silicon by a film-boiling technique.

A film-boiling technique for the preparation of silicon is described in an application by John W. Irvine, Jr., being filed simultaneously with this application. The present invention is an improvement of the method and apparatus described in said co-filed application.

The present invention describes an apparatus for preparing substantially pure elemental silicon at highly efficient rates by the thermal decomposition of a liquid silane compound in the vicinity of a suitable heatable target immersed in said liquid silane compound. The silicon recoverable by means of the reaction described herein is so decidedly advantageous in both quality and quantity that the invention is definitely an advancement in the preparation of commercial silicon. It follows then, that the adoption of preparing silicon in the manner to be described will assist in the growth of the semiconductor industry.

In accordance with the present invention, silicon is prepared from a liquid silane compound in a substantially oxygen-free atmosphere. Heating means is provided for heating a target fixedly held in place and immersed in said liquid, to a suitable temperature to deposit silicon by the film-boiling technique. Under the influence of said heated target, a vapor of said liquid surrounds the vicinity of said target and silicon is deposited on said target from said vapor. The silicon formed on said target is mechanically unstable and leaves said target, enabling said silicon to be separated and harvested from said liquid. In addition, by the use of means to separate said silicon from the walls of the container, the preparation of silicon is not necessarily limited to quartzware and other non-contaminating devices, but may be conducted in apparatus which is made of glassware or which comprises merely portions of glassware. The use of glassware apparatus is a substantial deviation from the teaching of the prior art and will be a significant factor in reducing the overall cost of preparing silicon.

The term "silane" compound as used in the description of the invention described herein refers to the "silane" compounds listed and described in the table, "Physical Constants of Inorganic Compounds," pages 586, 587 and 588 of the Handbook of Chemistry and Physics, 35th edition, 1953–1954, published by the Chemical Rubber Publishing Company.

The aforementioned objects and other objects of the invention are described in greater detail in subsequent paragraphs with reference being made to the accompanying drawing wherein:

Fig. 1 is a cross-sectional view of a silicon reactor;

Fig. 2 is an elevated view of a liner, having a portion cutaway, employed in the silicon reactor;

Fig. 3 is a view of the ball-joint arrangement employed for connecting portions of the apparatus together; and Fig. 4 is a cross-sectional view of a portion of the silicon reactor with direct heating means attached to a target in said reactor.

Referring now to Fig. 1, there is shown a glass container 10 which functions as the reactor. The reactor has an elongated portion 11 which is preferably shaped to be included within the air core of a plurality of windings 12 comprising an inductance heating device 13. The device 13 is connected to a high frequency supply 14 for energizing said windings to generate a magnetic field to heat a target 15 located within said reactor in the vicinity of said elongated portion.

A cylindrical liner 16, of a high-temperature material which is also substantially non-contaminating to silicon, such as quartz, is positioned horizontally between and adjacent to the walls of the reactor and rests on the portion of said reactor adjacent said elongated portion. A cylindrical liner 17 is approximately centrally located within the liner 16, and extends vertically from above said liner 16 to the base of the reactor. Said liner 17 is preferably made from the same material as said liner 16 since the requirements of said liners are identical. Said liner 17 may be made from cylindrical stock having a diameter less than that of the elongated portion 11 so that said liner fits into said elongated portion. In addition, as shown in Fig. 2, said liner 17 may be comprised of a top section 18 and a bottom section 19 connected together by a plurality of rods 20 in a manner to have an open portion therebetween to allow liquid to circulate around said bottom section for reasons to be explained subsequently. The top section has a flared edge which extends beyond the dimensions of the bottom section. A plurality of rods 20 are attached between the flared edge and the top of the bottom section. The target 15 is secured by means of a high-melting wire 21, such as molybdenum, which is threaded through holes in the target and holes in the bottom of the section 19.

The requirements of the target 15 are dependent upon the conditions selected for generating silicon by the film-boiling technique. The characteristics described presently are suitable for a thermal reaction occurring at atmospheric pressure. Alternate requirements for reactions at other pressures will be given subsequently. Since silicon melts at approximately 1400° C., the target material necessarily must be capable of withstanding said temperature. The target is preferably non-reactive and non-contaminating in the presence of silicon and should not decompose or evolve substances which would react with silicon. In this regard, carbon in the form of graphite and silicon carbide have been found to be suitable target materials. Furthermore, a teardrop or pear-shaped configuration has been found to be the most stable configuration for the target.

Referring back to Fig. 1, also located in the interior of the reactor is a hollow, cylindrical feed tube 22, having one end thereof secured to a lid 23 of the reactor, and the other end held in place by a baffle 24. The baffle 24 is comprised of a plurality of wafer-shaped members 25 with openings therein to admit the tube 22, separated therebetween by a plurality of rods 26, and having dimensions substantially equal to that of the interior diameter of the reactor in order to have the ends of said baffles rest against the walls of said reactor. The feed tube 22 is comprised of a hollow cylindrical section 27 joined to a section 28 terminated with a flared edge. A source of an inert gas, such as nitrogen, or a source of an inert rare gas, such as argon, may be attached to the end of the tube 22 for expelling oxygen-bearing air initially, and to have the reaction occurring in said reactor take place in an oxygen-free atmosphere. Approximately intermediate the section 28 of the tube 22 and the section 19 of the liner 17, an inlet 29, formed as an integral part of said reactor, abuts therefrom. The inlet 29 is terminated with a female joint, and the male joint of an inlet tube 30 mates therewith, as shown in Fig. 3. The arrangement of joints enables the inlet tube to be angularly positioned. A clamp 31 connected across said joints clamps them in the position selected.

An outlet 32 may be formed as an integral part of the reactor substantially opposite from the inlet 29. The outlet is similarly terminated with a female joint in order to accept a defractionating column 33, terminated with a male joint therein, and to secure same by means of a clamp 34. The other end of the column 33 is terminated with a female joint for connection to the male joint of an air condenser 35. A clamp 36 secures the air condenser to the column. Said column is filled with glass beads 37, having a substantially large surface area, in order to separate gases evolved during the reaction by means of the differences in their boiling points. A plate 38 is disposed in said column for supporting said beads. A high melting, non-contaminating substance, such as molybdenum, may be used as the plate.

The air condenser 35 is terminated with a male joint which mates with the female joint of an inlet 39 of a receiver 40. A clamp 41 secures the condenser to the receiver. An outlet 42, having a female joint, mates with the male joint of an outlet tube 43. A clamp 44 secures the outlet tube to the outlet. A bent stirring rod 45 is disposed in the outlet tube for scraping solid material off the walls of said outlet tube. A lower boiling gas evolved during the reaction and passing through the defractionating column can be converted to a liquid by cooling said gas in the condenser. The liquid is collected in the receiver 40. A small percentage of the gas escaping through the outlet tube 43 deposits solid material thereon, which solid can be scraped therefrom with the rod 45.

The most efficient preparation of silicon having been found to occur when the target was anchored and unable to float and thrash around, other methods of anchoring the target either to the reactor itself using high-melting materials and suitable bonding agents or to a non-contaminating liner within the reactor will immediately suggest themselves to persons skilled in the art. Nevertheless, alternate methods will not depart from the scope of the present invention. In the same regard, while inductance heating has been described, direct heating comprising either a D.-C. or A.-C. supply connected to the target may be employed for heating same. Referring to Fig. 4, wires 46 and 47 connected to a target 48 may be sealed into the reactor wall and connected to a supply 49. Additionally, the resistance of said target will be such as to develop the required temperature. Other heating devices known to persons skilled in the art may also be used to heat said target.

In accordance with the present invention, a liquid silane compound is introduced into the reactor at the inlet tube 30. Suitable silane compounds may be liquids, gases, or solids at room temperature and atmospheric temperature and may be of the type to be described subsequently. Naturally, the inlet tube 30 may be connected to another reactor wherein solids and gases are convertible to applicable liquid compounds. For example, tetraiodosilane, a solid at room temperature and atmospheric pressure, may be preheated in another reactor for converting same into its liquid state, and said liquid fed into the present reactor for the preparation of silicon. A quantity of said liquid can be introduced into the reactor to cover the section 19. Alternatively, a lesser quantity of the liquid can be added and the proper level established by adding solid material to the liquid when it is heated to a temperature sufficient to melt said solid.

Upon energization, the device 13 heats the target to approximately 1400° C., at which temperature silicon melts. The liquid compound ebullates vigorously and liquid circulates around the section 19 to the target mounted therein. At the higher temperatures, a vapor of tetraiodosilane surrounds the target. The heat of said target thermally decomposes said vapor into silicon and iodine, which silicon deposits on said target, while gaseous iodine and tetraiodosilane fill the confines of the reactor. Due to the vigorous action of the liquid and the difference in density between the silicon and the tetraiodosilane, silicon pellets formed on said target float to the surface of the liquid and can be harvested therefrom when the reaction ends. The gases evolved during the reaction are prevented from arising into the area of the lid 23 by the baffles 25, and instead rise into the defractionating column wherein the gaseous tetraiodosilane is converted to its liquid state and flows back into the reactor. The lower boiling iodine gas flows into the condenser 35 wherein it is converted into a liquid and is stored in the receiver 40. A minute amount of iodine gas escaping liquification is expelled from outlet tube 43, while solid iodine forming in said outlet tube may be scraped therefrom with the stirring rod 45.

As previously mentioned and described herein, gaseous, liquid and solid silane compounds are applicable to the film-boiling technique for preparing silicon. It is readily foreseeable that the embodiment of the present invention will suggest other alternatives to persons skilled in the art. Reactors may readily comprise means for converting and maintaining a silane compound in its liquid state at other combinations of temperature and pressure without departing from the principles of the reactor described herein. The characteristics of the target material will conceivably change under such conditions in that said target will have to be stable under the pressure used while its temperature-resistant characteristics may be reduced. It can be seen that, basically, the requirements of the target are that it withstand the pressure of the system, be non-contaminating, and capable of being heated to a temperature sufficient to cause the generation of a vapor of the liquid silane compound and to deposit silicon therefrom.

The film-boiling technique is applicable to a wide range of silicon-bearing compounds or silanes. These silane compounds may be solids, liquids, or gases at room temperature and may be classified as inorganic silane compounds or some may be classified as the silicon-organic analogues of saturated hydrocarbons or halogenated hydrocarbons.

An empirical formula of the applicable silicon compounds is represented by the hypothetical compounds $Si_A X_B Y_C Z_D$, in which $X_B$, $Y_C$, and $Z_D$ are the only elements dissimilar from silicon which are attached to the $Si_A$ atom, and where the symbols have the following significance:

$Si_A$ denotes the number of tetravalent silicon atoms in the compound; and $X_B$ denotes the number of hydrogen atoms in the compound. B may range from zero to 2 (A+1), but X does not exist in the compound when B is zero; and $Y_C$ denotes the number of halogen atoms in the compound. C may range from zero to 2 (A+1), but Y does not exist in the compound when C is zero; and $Z_D$ denotes the number of halogen atoms in the compound different from Y atoms. D may range from zero to 2 (A+1)−C, but Z does not exist in the compound when D is zero.

In addition, the integral number of atoms of the compound $Si_A X_B Y_C Z_D$ obeys the following equation: B+C+D=2 (A+1).

Five groups of compounds derived from the empirical formula will illustrate the range of silane compounds that may be employed for the preparation of silicon by the film-boiling technique. They may be identified as follows:

(a) When C and D of the empirical formula are zero, $Si_A X_B$ identifies the hydrogen saturated silicon compounds including silane, disilane, trisilane, tetrasilane, etc. and may include unsaturated compounds having more than one silicon atom.

(b) When B and D of the empirical formula are zero, $Si_AY_C$ identifies the halogen saturated silicon compounds of one or more silicon atoms including the tetrahalogen silanes, the hexahalogen disilanes, the octahalogen trisilanes, etc.

(c) When B and C of the empirical formula are zero, it is obvious that $Si_AZ_D$ identifies the same halogen saturated compounds referred to in (b) above, so that it is not classified as a group insofar as this discussion is concerned.

(d) When D is zero, but B and C are other than zero, $Si_AX_BY_C$ identifies the substituted halogenated silane compounds of which the mono, di, and trihalogen compounds of a single silicon atom are exemplified by triodosilane, dibromosilane, and chlorosilane. Additionally, are included the halogen substituted and monovalent substituted elements of compounds having more than one silicon atom that can be synthesized and which can be liquids at a practical temperature or pressure, or a combination of both to employ the film-boiling technique described herein.

(e) When B is zero, but C and D are other than zero, $Si_AY_CZ_D$ identifies the substituted dissimilar halogen compounds including the mono, di, and trihalogen forms of single silicon atoms such as bromotrichlorosilane, dibromodichlorosilane, trichloroiodosilane, etc. Additionally, are included the halogen substituted halogen compounds having more than one silicon atom that can be synthesized.

(f) When B, C and D are not zero, $Si_AX_BY_CZ_D$ identifies the partially substituted dissimilar halogen compounds of saturated and unsaturated silanes which exist readily or that can be synthesized for adaptation to the film-boiling technique described herein.

Having described an apparatus for preparing silicon with various alternatives for selecting the target material and for energizing same, and the silane compounds applicable to the film-boiling technique, it is desired that the appended claims be given a broad interpretation commensurate with the principles described herein.

What is claimed is:

1. In combination, apparatus for preparing substantially pure elemental silicon comprising a container adapted to receive and retain a liquid silane compound, means for feeding said liquid into said container, a target made of a material selected from the group consisting of graphite and silicon carbide positioned in the bottom of said container whereby said target is immersed in said liquid when said liquid is present in said container, a quartz liner surrounding said target and being disposed away from the walls of said container to substantially constitute a chamber within said container, said liner further being composed of a top section and a bottom section with a narrow-width annular gap between said sections whereby said liquid is allowed to circulate around said bottom section of said liner and thereby cause pellets of silicon formed on said target to float to the surface of said liquid, and means for heating said target to a suitable temperature to generate a vapor of said liquid in the vicinity of said target from which silicon is extracted.

2. A combination as defined in claim 1 wherein said target is substantially of teardrop configuration.

References Cited in the file of this patent
UNITED STATES PATENTS

| | | |
|---|---|---|
| 2,364,775 | Brice | Dec. 12, 1944 |
| 2,438,892 | Becker | Apr. 6, 1948 |
| 2,706,153 | Glasser | Apr. 12, 1955 |

OTHER REFERENCES

Litton et al.: High Purity Silicon, J. Electochem. Soc., June 1954, vol. 101, No. 6, pp. 287–292.

Parravano et al.: "Chemical Abstracts," vol. 17 (1923), page 3651.